United States Patent [19]

Shimoda

[11] Patent Number: 5,216,351
[45] Date of Patent: Jun. 1, 1993

[54] CASCADED SWITCHING AND SERIES REGULATORS

[75] Inventor: Sadashi Shimoda, Tokyo, Japan

[73] Assignee: Seiko Instruments Inc., Japan

[21] Appl. No.: 698,593

[22] Filed: May 10, 1991

[30] Foreign Application Priority Data

May 16, 1990 [JP] Japan .................................. 2-125794

[51] Int. Cl.$^5$ ...................... H02M 3/156; G05F 1/563
[52] U.S. Cl. .................................... 323/224; 323/266; 323/268
[58] Field of Search ............... 323/222, 224, 266, 268, 323/273, 274, 282, 284; 363/124

[56] References Cited

U.S. PATENT DOCUMENTS

| | | | |
|---|---|---|---|
| 4,347,474 | 8/1982 | Brooks et al. | 323/224 |
| 4,459,537 | 7/1984 | McWhorter | 323/224 |
| 4,754,388 | 6/1988 | Pospisil | 363/54 |
| 4,893,228 | 1/1990 | Orrick et al. | 363/89 |

FOREIGN PATENT DOCUMENTS

| | | | |
|---|---|---|---|
| 137414 | 10/1981 | Japan | 323/224 |
| 452816 | 5/1975 | U.S.S.R. | 323/224 |
| 465627 | 6/1975 | U.S.S.R. | 323/266 |
| 657420 | 4/1979 | U.S.S.R. | 323/268 |
| 691819 | 10/1979 | U.S.S.R. | 323/224 |
| 1064942 | 4/1967 | United Kingdom . | |
| 1095458 | 12/1967 | United Kingdom . | |

Primary Examiner—William H. Beha, Jr.
Attorney, Agent, or Firm—Bruce L. Adams; Van C. Wilks

[57] ABSTRACT

The voltage regulator of the boosting/lowering type is comprised of a switching regulator block and a series regulator block, which are cascade-connected to each other. One input terminal of an error amplifier of the switching regulator block is connected to a dividing node of bleeder resistors in the series regulator block to constitute a regulative feedback loop effective to improve an efficiency of the voltage regulator.

7 Claims, 2 Drawing Sheets

CASCADED SWITCHING AND SERIES REGULATORS

BACKGROUND OF THE INVENTION

The present invention relates to a voltage regulator, and more specifically relates to a voltage regulator of the voltage boosting/lowering type comprised in the combination of a switching regulator block and a series regulator block.

FIG. 2 is a block diagram of the conventional voltage regulator. The regulator is comprised of a switching regulator block 111 and a series regulator block 110. The preceding switching regulator block 111 receives an input voltage $V_{IN}$ at its input terminal 101 and produces a boosted intermediate voltage $V_{SW}$ of a constant level at its junction terminal 102. The succeeding series regulator block 110 receives the intermediate voltage and produces a lowered output voltage $V_{OUT}$ of a constant level at its output terminal 108.

However, the conventional regulator has the following drawbacks. A level of the intermediate voltage $V_{SW}$ at the junction terminal 102 is determined by a resistance ratio of internal voltage-dividing resistors connected to the junction terminal 102. On the other hand, a level of the output voltage $V_{OUT}$ at the output terminal 108 is determined by another resistance ratio of internal voltage-dividing resistors connected to the output terminal 108. Namely, the intermediate voltage $V_{SW}$ at the junction terminal 102 and the output voltage $V_{OUT}$ at the output terminal 108 are determined independently from each other. Therefore, the series regulator block 110 has a voltage conversion efficiency determined by $V_{OUT}/V_{SW}$ which is held constant regardless of an amount of an electric current taken from the output terminal 108, thereby hindering the operative efficiency of the voltage regulator.

SUMMARY OF THE INVENTION

In view of the above noted problem of the prior art, an object of the present invention is to provide an improved voltage regulator of the boosting/lowering type operative to vary the voltage conversion efficiency of the series regulator block according to an amount of the output electric current so as to regulatively obtain an optimum efficiency. More particularly, a regulative feedback loop is provided such that a regulative voltage taken from a part of the internal voltage-dividing resistors in the series regulator block is fed back to one of input terminals of a differential or error amplifier of the preceding switching regulator block, thereby improving the voltage conversion efficiency.

DETAILED DESCRIPTION OF EMBODIMENT

Hereinafter, an embodiment of the invention will be described in detail in conjunction with the drawings.

Figure 1:
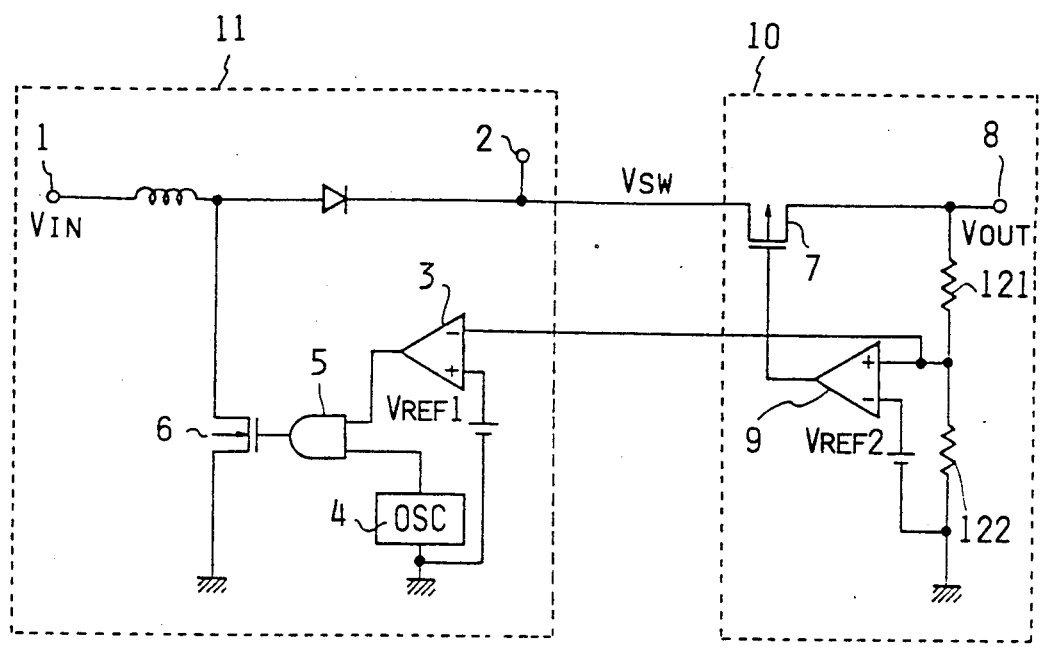
FIG. 1 is a circuit diagram of the inventive voltage regulator.
Figure 2:
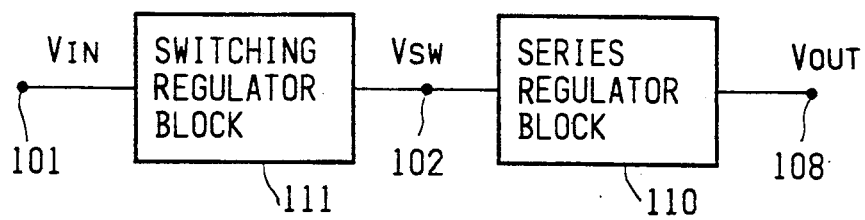
FIG. 2 is a block diagram of the conventional voltage regulator.

FIG. 1 shows a circuit diagram of the voltage regulator according to the invention. The voltage regulator is comprised of a preceding switching regulator block 11 and a succeeding series regulator block 10, which are preferably integrated into one chip of a semiconductor device to form a monolithic MOS IC device.

The switching regulator block 11 receives an input voltage $V_{IN}$ at its input terminal 1, and produces an intermediate voltage $V_{SW}$ at its junction terminal 2 through a coil and a diode. There is provided an error amplifier 3 or differential amplifier operative to regulate a level of the intermediate voltage $V_{SW}$ at the junction terminal 2, according to a difference between a regulative voltage $V_{FB}$ fed to a negative input terminal of the error amplifier 3 and a reference voltage $V_{REF1}$ supplied to a positive input terminal of the amplifier 3. An output terminal of the error amplifier 3 and another output terminal of an oscillating circuit 4 are connected to a gate electrode of a control transistor 6 through a gate circuit 5 to constitute a basic circuit construction of the switching regulator block 11 of the voltage boosting chopper type operative to boost the input voltage $V_{IN}$ according to well known principles.

Further, the junction terminal 2 of the switching regulator block 11 is connected to an output terminal 8 of the series regulator block 10 through a control transistor 7 so as to produce a constantly regulated output voltage $V_{OUT}$. The output voltage $V_{OUT}$ is fed back through one of voltage-dividing or bleeder resistors 121 and 122 which are connected between the output terminal 8 and the ground, to a positive input terminal of an error amplifier 9 which has a negative input terminal receptive of a given reference voltage $V_{REF2}$. An output terminal of the error amplifier 9 is connected to a gate electrode of the control transistor 7, thereby constituting the series regulator block 10, operative to lower the intermediate voltage $V_{SW}$ to the output voltage $V_{OUT}$ of a constant level.

Further, the negative input terminal of the error amplifier 3 and the positive input terminal of the error amplifier 9 are interconnected to one another to constitute a regulative feedback loop.

Next, the operation of the FIG. 1 circuit is described in detail. The regulative voltage $V_{FB}$ is fed back to the negative input terminal of the error amplifier 3 of the switching regulator block 11 from a junction node between the bleeder resistors 121 and 122 of the series regulator block 10. Hence, the intermediate terminal 2 develops the intermediate voltage $V_{SW}$ having a level identical to the sum of the output voltage $V_{OUT}$ at the output terminal 8 and a drop voltage drop developed across the control transistor 7. The voltage drop through the control transistor 7 varies according to the output electric current taken from the output terminal 8.

Figure 3:
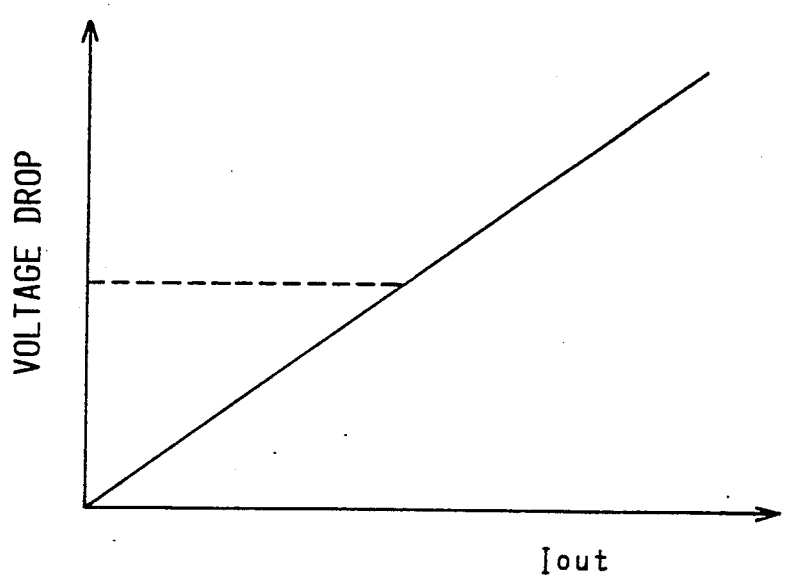
FIG. 3 is a graph showing the relation between an amount of an output electric current and a voltage drop value across a control transistor.
Figure 4:
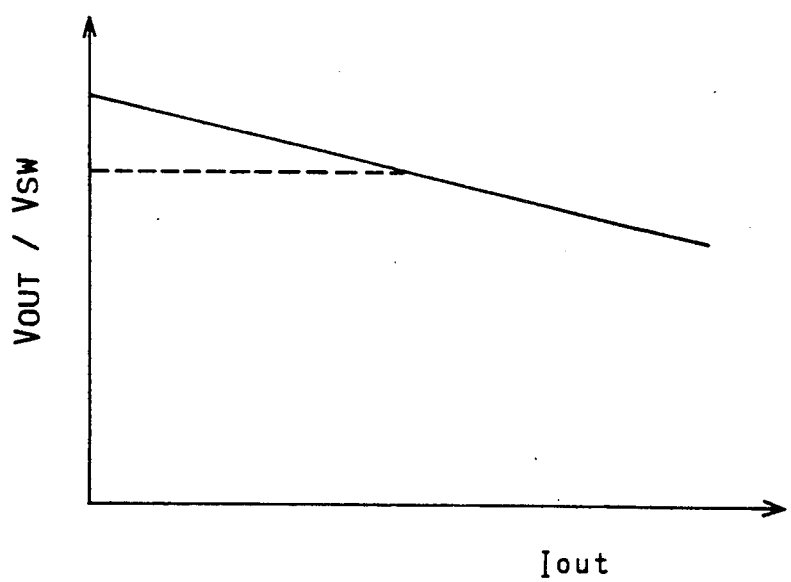
FIG. 4 is a graph showing the relation between an amount of the output electric current and the voltage conversion efficiency of the inventive regulator.

FIG. 3 indicates a graph showing this relation. As the output electric current $I_{OUT}$ increases as indicated in the horizontal axis of the graph, the voltage drop linearly increases across the control transistor 7. On the other hand, in the prior art, the voltage drop is kept constant, as indicated by the broken line of the FIG. 3 graph, in a range where the output electric current $I_{OUT}$ is relatively small. Namely, in the present invention, the intermediate voltage $V_{SW}$ at the junction terminal 2 is varied according to the output electric current value, hence the efficiency $V_{OUT}/V_{SW}$ of the series regulator block 10 is optimumly regulated as indicated by a graph of FIG. 4. In the graph, the solid line shows the change of efficiency according to the invention, and the broken line shows the change of efficiency in the prior art. As understood from the graph, the inventive regulator has an efficiency better than that of the prior art in a range where the output electric current is small.

In the FIG. 1 regulator, the negative input terminal of the error amplifier 3 is connected to the positive input terminal of the error amplifier 9. However, the invention is not restricted to such a construction, but generally a regulative voltage can be fed from a part of the bleeder resistors 121 and 122 to the negative input terminal of the error amplifier 3.

As described above, according to the invention, a regulative voltage is taken from a part of the bleeder resistors in the series regulator block, and is fed back to one input terminal of the error amplifier in the switching regulator block, thereby advantageously realizing an improved voltage regulator of the boosting/lowering type having a high efficiency.

What is claimed is:

1. A voltage regulator comprising: a leading switching regulator block including a first error amplifier having input terminals, an oscillating circuit, a switching transistor receiving a signal from the oscillating circuit in accordance with a signal from the first error amplifier and a coil connected to the switching transistor; and a following series regulator block including a control transistor, and bleeder resistors for feeding back a regulative voltage to one of the input terminals of the first error amplifier and to the gate of the control transistor for effecting a voltage drop from the output from the leading switching regulator block controlled by the regulative voltage.

2. A voltage regulator as claimed in claim 1, wherein the gate of the control transistor is connected to an output terminal of a second error amplifier included in the following series regulator block.

3. A voltage regulator as claimed in claim 2, wherein one of the input terminals of the second error amplifier is connected to a junction node between the bleeder resistors.

4. A voltage regulator comprising:
   first regulating means receptive of an input voltage for producing a boosted intermediate level voltage output; and
   second regulating means receptive of the intermediate level voltage output for producing a lower regulated voltage output, the second regulating means comprising a control transistor receptive of the intermediate level voltage for effecting a voltage drop thereacross to produce the regulated voltage output and having a gate input for determining the voltage drop, and control means receptive of the regulated voltage output for producing a control signal corresponding to the regulated voltage and for applying the control signal to the gate of the control transistor.

5. A voltage regulator according to claim 4, wherein the means for producing the control signal comprises bleeder resistors receptive of the regulated voltage output to divide same, and means for applying the divided voltage to the gate of the control transistor.

6. A voltage regulator according to claim 5, wherein the first regulating means comprises an error amplifier receptive of the divided voltage and a reference voltage, a switching transistor receptive of an output from an oscillating circuit and the error amplifier, and a coil connected to the switching transistor for boosting the input voltage.

7. A voltage regulator according to claim 5, wherein the means for applying the divided voltage comprises a second error amplifier receptive of the divided voltage and a reference voltage.

* * * * *